(12) United States Patent
Yoshimura et al.

(10) Patent No.: US 6,951,423 B2
(45) Date of Patent: Oct. 4, 2005

(54) SINTERED BEARING AND PRODUCTION METHOD THEREFOR

(75) Inventors: Noriyuki Yoshimura, Nagano (JP); Katsutoshi Nii, Hitachi (JP)

(73) Assignees: Minebea Co., Ltd., Nagano (JP); Hitachi Powdered Metals Co., Ltd., Chiba (JP)

( * ) Notice: Subject to any disclaimer, the term of this patent is extended or adjusted under 35 U.S.C. 154(b) by 267 days.

(21) Appl. No.: 10/401,289

(22) Filed: Mar. 27, 2003

(65) Prior Publication Data

US 2004/0001656 A1 Jan. 1, 2004

(30) Foreign Application Priority Data

Mar. 27, 2002 (JP) ........................................ 2002-088894

(51) Int. Cl.[7] .............................................. F16C 33/12
(52) U.S. Cl. ..................... 384/279; 384/902; 29/898.12; 29/898.13
(58) Field of Search ................................ 384/100, 114, 384/118, 279, 902; 29/898.11, 898.12, 898.13, 898.14

(56) References Cited

U.S. PATENT DOCUMENTS

| 2,663,928 A | * | 12/1953 | Wheeler, Jr. | .................. 29/424 |
| 2,691,814 A | * | 10/1954 | Henry | .......................... 428/545 |
| 3,054,649 A | * | 9/1962 | Arnold et al. | ................. 384/29 |
| 6,669,371 B2 | * | 12/2003 | Tanaka et al. | .............. 384/279 |

* cited by examiner

Primary Examiner—William C. Joyce
(74) Attorney, Agent, or Firm—Brinks Hofer Gilson & Lione

(57) ABSTRACT

A sintered bearing is produced by a production method comprising: compacting a metallic raw material powder into a bearing green compact; sintering the green compact into a sintered compact; forming a resin coating 20 over the entire surface of the sintered compact; removing the resin coating 20 on a bearing surface 14a of the sintered compact; and impregnating a lubricating fluid L through the bearing surface 14a from which the resin coating 20 is removed.

5 Claims, 2 Drawing Sheets

SINTERED BEARING AND PRODUCTION METHOD THEREFOR

BACKGROUND OF THE INVENTION

1. Field of the Invention

The present invention relates to a sintered bearing and a production method therefor suitable in various rotating portions or motors mounted in, for example, information devices, office equipment, electrical appliances, construction equipment, and the like.

2. Related Art

Sintered bearings produced according to a powdered metal technique have been widely used for the above applications since they are easy and inexpensive to mass-produce, and in particular, the size of the final product is uniform. Sintered bearings are roughly produced by compacting a metallic raw powder into a bearing green compact, sintering the green compact into a sintered compact, then subjecting the sintered compact to a sizing process to finish into required size and shape.

Sintered bearings are commonly used as oil retaining sintered bearings in which a lubricating oil is impregnated in pores therein for lubrication. As oil retaining sintered bearings for precise high speed rotation motors used in, for example, spindle motors for HDDs (hard disk drives), there have been provided bearings in which grooves for generating dynamic pressure are formed on an inner peripheral bearing surface. The dynamic pressure is generated by increase in the pressure in a oil film formed between a rotating shaft and a bearing, and this realizes support of the rotating shaft in a non-contact manner with a low torque and highly precise rotation.

The oil retaining sintered bearings sometimes exude the oil and contaminate the surroundings, and the bearings are not easy to use in portions required to usually be clean, such as hinges of covers in note-type personal computers and portable telephones.

When oil retaining sintered bearings are used for guide bushes in transportation structures in construction equipment such as power shovels, the bearings are exposed to sand and water introduced therein. Therefore, bearings are, for example, sealed in cases to form waterproof means so as to improve corrosion resistance and reliability. However, the waterproof means require complicated structures, and maintenance is not easy since the case must be opened when the oil must be resupplied. Moreover, sintered bearings are washed before impregnation of a lubricating oil. When the detergents used for the washing remain in pores of the sintered bearings, noxious gases may be given off due to increase of temperature in use.

SUMMARY OF THE INVENTION

Therefore, an object of the present invention is to provide a sintered bearing and a production method therefor capable of restraining leakage of a lubricating oil and release of noxious gases, and capable of improving corrosion resistance while obtaining lubricating performance for a bearing surface.

The present invention provides a sintered bearing comprising: a bearing body having a bearing surface; a resin coating provided over the surface of the bearing body except for the bearing surface; and a lubricating fluid impregnated in pores in the bearing body.

In the bearing of the sintered bearing, leakage of a lubricating oil and release of noxious gases are restrained by the resin coating formed over the surface of the bearing body except for the bearing. The resin coating avoids the bearing body from contacting with air and from being penetrated with water thereinto, and corrosion resistance is therefore improved. In contrast, the bearing surface is usually lubricated by the lubricating fluid or oil provided from pores, and good sliding performance with a rotating shaft is obtained.

The present invention further provides a production method for a sintered bearing, the method comprising: compacting a metallic raw material powder into a bearing green compact; sintering the green compact into a sintered compact; forming a resin coating over the entire surface of the sintered compact; removing the resin coating on a bearing surface of the sintered compact; and impregnating a lubricating fluid from the bearing surface from which the resin coating is removed.

In the production method, only the resin coating on a bearing surface of the sintered compact is removed after forming a resin coating over the entire surface of the sintered compact. In the invention, sizing for finishing a bearing surface into a required size may performed by machining such as drilling, and the resin coating may be removed in the sizing. According to the production method, sintered bearings of the invention are easily produced. Vacuum impregnation is effective for impregnating the lubricating fluid or oil into the pores. In this method, a large amount of lubricating oil can be impregnated into the pores at inner portion of the sintered bearing. The lubricating oil filled in the pores is effectively held since the surface of the sintered bearing except for the bearing surface is covered by the resin coating, and the interval for resupplying a lubricating oil can be extended. Furthermore, the density of the lubricating oil in the sintered bearing can be large, so that fitting performance between the bearing and a rotating shaft, wear resistance, corrosion resistance, cleanliness, and the like, can be improved.

In the production method of the invention, the resin coating is preferably formed by electrodeposition. Thickness of the resin coating can be easily controlled and made uniform since the electrodeposition is applied. The thickness of the resin coating is easily controlled by controlling the voltage applied in the electrodeposition, application time, temperature of the electrolyte, and the like. The thickness of the resin coating is uniform according to the characteristics of the electrodeposition, and bearings having suitable coating thickness according to the equipment employed are therefore produced. Furthermore, the coating thickness can be extremely thin, so that size reliability originally provided in sintered bearings is maintained, and the bearings can be applied to small parts equipment, and additionally, the method can easily applied to mass-production.

In the method of the invention, pores are reliably sealed since the electrophoretic resin penetrates into the small pores on the surface of the bearing in the electrodeposition, so that the resin penetrated into the pores functions as an anchor, and the resin is rigidly secured to the surface to avoid from being stripped therefrom. Furthermore, the bearing is employed as an electrode, and a uniform resin coating is easily formed even for bearings having complicated shape. It should be noted that the thickness of the resin coating is set so as to obtain the above mentioned advantages. In particular, the thickness is preferably 5 $\mu$m or more to uniformly coat the entire surface of the bearing, and the thickness is preferably 100 $\mu$m or less, and is more preferably 50 $\mu$m or less, to ensure the lubricating performance for a bearing and wear resistance, and the like.

The electrodeposition of the present invention may be performed by a typical known method. That is, an electrode and a sintered compact separated from each other are dipped into an electrolyte mixed with a resin, and a dc voltage is applied between both for predetermined time. By the interaction of the applied voltage, the resin in the electrolyte electrophoretically moves toward the sintered compact and adheres there to form a resin coating. A cathode is used for the electrode dipped in the electrolyte when an anionic electrodeposition is applied, and an anode is used for the electrode when a cationic electrodeposition is applied, but the later method is popular in recent years. The sintered compact after forming a resin coating is baked in a baking and drying furnace, and the resin coating is cured on the surface of the sintered compact. These treatments are the electrodeposition process.

As the resin, PTFE (polytetrafluoroethylene) with lubrication, nylon, PEEK (polyetheretherketone) with heat proof and wear resistance, polyimidle, epoxy, and the like are suitable.

DESCRIPTION OF THE PREFERRED EMBODIMENTS

An embodiment of the invention will be explained with reference to the drawings hereinafter.

Figure 1:
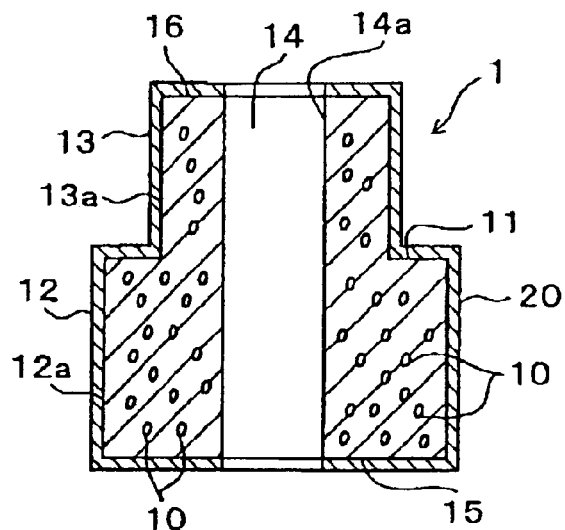
FIG. 1 is a vertical cross-sectional view of a sintered bearing produced by an embodiment of the invention.
Figure 2:
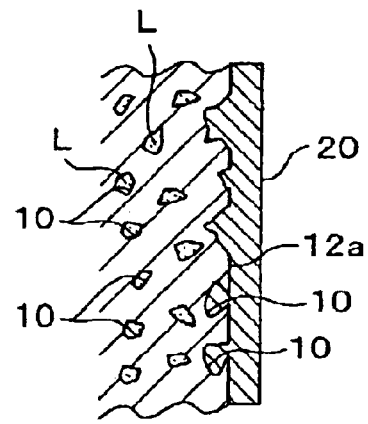
FIG. 2 is an enlarged cross-sectional view of a surface layer of the bearing produced by the embodiment of the invention.

FIG. 1 shows a cylindrical oil retaining sintered bearing produced by the production method of the invention. The sintered bearing 1 is formed with an annular stepped portion 11 consisting of a planar surface along the radial direction, and the stepped portion 11 divides the outer surface of the bearing 1 into a large diameter portion 12 and a small diameter portion 13. The bearing 1 has a bearing hole 14 at its center, into which a rotating shaft (not shown) is inserted, has a uniform diameter, and the inner surface of the bearing hole 14 is employed as a bearing surface. The surface of the bearing 1 except for the bearing surface 14a, that is, the outer peripheral surfaces 12a and 13a of the large diameter portion 12 and the small diameter portion 13, and end surfaces 15 and 16 of the large and small diameter portions 12 and 13, and end surface of the stepped portion 11, are covered by a resin coating 20 having a uniform thickness, as shown in FIG. 2. FIG. 2 shows the surface layer of the outer surface 12a of the large diameter portion 12. As shown in FIG. 2, pores 10 in the bearing 1 is impregnated with a lubricating oil L. The thickness of the resin coating 20 is set according to required specifications. A production method for producing the bearing 1 will be explained hereinafter.

1. Sintering Step

An alloy raw material powder having a predetermined chemical composition such as an Fe—Cu type alloy powder mainly consisting of Fe and Cu for a bearing is compacted into a green compact having a shape similar to that shown in FIG. 1. Then, the green compact is sintered into a sintered bearing compact at a suitable temperature and time.

2. Electrodeposition Step (Resin Coating Forming Step)

A resin for forming a resin coating is dispersed in an electrolyte charged into an electrodeposition vessel at a predetermined proportion to prepare a coating medium, and the coating medium is agitated and maintained for a predetermined time. An electrode and the bearing compact separated from each other are dipped into the coating medium, and a dc voltage is applied between both for predetermined time. By the interaction of the applied voltage, the resin particles having a charge in the electrolyte electrophoretically move toward the bearing compact, and adhere there to form a resin coating. The bearing compact after forming a resin coating is baked in a baking and drying furnace, and the resin coating is cured on the surface of the bearing compact. These treatments are the electrodeposition process, in which a sintered bearing formed with a resin coating over the entire surface thereof is thus produced.

3. Sizing Step (Resin Coating Removing Step)

The sintered bearing formed with the resin coating over the entire surface thereof is subjected to a sizing step. In the sizing step, the bearing surface contacting with a rotating shaft is machined so as to remove the resin coating formed on the bearing surface, and to finish the inner diameter into a designed size.

4. Step for Impregnating Lubricating Oil

A lubricating oil is impregnated through the bearing surface which is exposed by removing the resin coating into pores in the bearing by vacuum impregnation.

The oil retaining sintered bearing 1 shown in FIG. 1 is thus obtained. According to the bearing 1, leakage of the lubricating oil L and release of noxious gases are restrained since the resin coating 20 is formed over the surface of the bearing 1 except for the bearing 14a. The resin coating 20 avoids the bearing 1 from contacting with air and from being penetrated with water thereinto, and corrosion resistance is therefore improved. The bearing surface 14a is usually lubricated by the lubricating oil provided from the pores 10, and good sliding performance with a rotating shaft is obtained.

In the production method of the invention, the thickness of the resin coating 20 can be easily controlled and made uniform since the resin coating 20 is formed over the surface of the bearing 1 by electrodeposition. The thickness of the resin coating 20 is easily controlled by controlling the voltage applied in the electrodeposition, applying time, temperature of the electrolyte, and the like. The thickness of the resin coating 20 is uniform according to the characteristics of the electrodeposition, and oil retaining sintered bearings having suitable coating thickness according to equipment employed are therefore produced. Furthermore, the coating thickness can be extremely thin, so that size reliability originally provided in sintered bearings is maintained, and the bearings can be applied to small parts and mass-production.

In addition, pores 10 are reliably sealed since the electrophoretic resin penetrates into the small pores 10 on the surface of the bearing in the electrodeposition, so that the pores are sufficiently sealed and the penetrated resin into the pores functions as an anchor, and the resin is rigidly secured to the surface to avoid from being stripped therefrom. Furthermore, the sintered bearing is employed as an electrode, and a uniform resin coating 20 is easily formed even for bearings having complicated shape.

Furthermore, a large amount of lubricating oil L can be impregnated into the pores 10 at inner portion of the bearing 1. The lubricating oil L filled in the pores 10 is effectively held since the surface of the sintered bearing except for the bearing surface 14a is covered by the resin coating 20, and the interval for resupplying a lubricating oil L can be extended. Furthermore, the density of the lubricating oil L in the bearing 1 can be large, so that fitting performance between the bearing 1 and a rotating shaft, wear resistance, corrosion resistance, cleanliness, and the like, can be improved.

Figure 3:
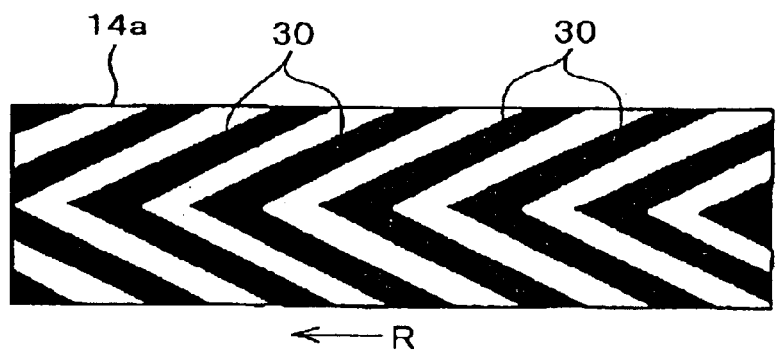
FIG. 3 is an expanded view of the inner peripheral surface of the bearing formed with dynamic pressure generating grooves.

It should be noted that grooves for generating radial dynamic pressure may be formed on a bearing surface 14a of the bearing 1. The grooves may be formed in another sizing process, in which the bearing 1 is compacted again, and the axial length, outer diameter, and inner diameter are finished to a designed size while coining the grooves . Several types of grooves are applied to the invention. For example, as shown in FIG. 3, herringbone grooves 30 comprised of multiple V-shaped grooves are mentioned. The herringbone grooves 30 are formed parallel to each other at a constant distance and the intersecting portions thereof converge toward the rotational direction R of a rotating shaft. In this modification with the dynamic pressure generating grooves 30, the oil film formed between the rotating shaft and the bearing surface 14a has a high pressure due to the rotation of the rotating shaft, and the rotating shaft is supported with highly precise rotation in a non-contacted manner and in a low torque.

Figure 4:
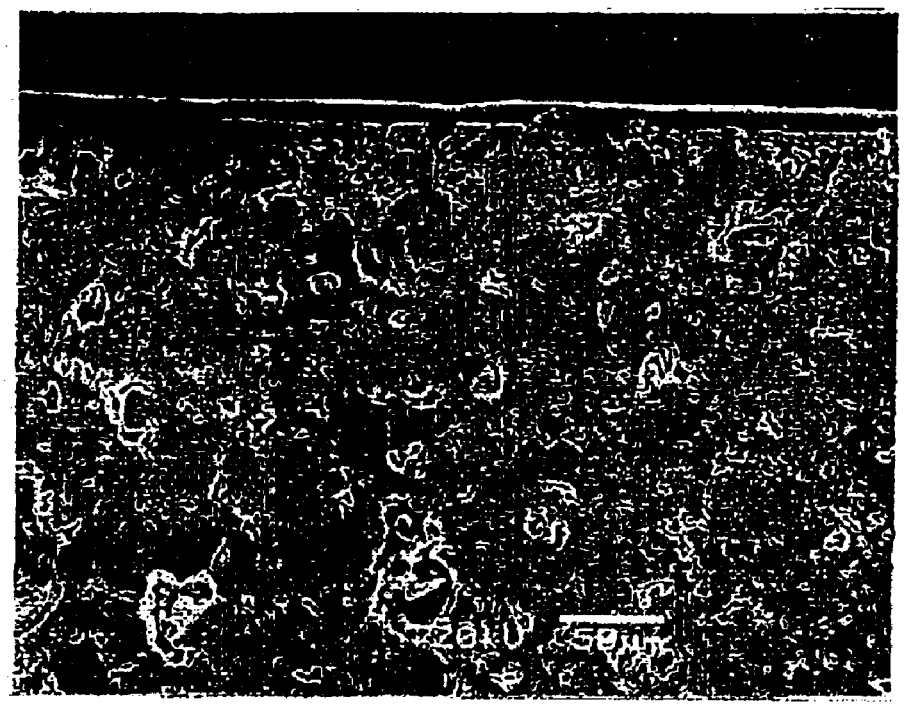
FIG. 4 is a SEM photograph showing a surface layer at the outer surface side of the bearing.

FIG. 4 is a SEM photograph showing surface layer of a sintered bearing in the embodiment shown in FIG. 1 produced by forming a resin coating followed by partially removing the resin coating. The thicknesses of the resin coating at the outer surfaces 12a and 13a of the large and small diameter portions 12 and 13, at the end surface 15 of the large diameter portion 12, and at the bearing surface 14a were measured from the SEM photograph. FIG. 4 shows a surface layer of the outer surface 13a of the small diameter portion 13, and the photograph demonstrated that a resin coating with uniform thickness of from 50 to 60 $\mu$m was formed on only the surface layer and the pores in inner portion from the resin coating were vacant. In addition, it was confirmed that pores on the outer surface 13a on which the resin coating was formed were closely filled with the resin and that the resin was rigidly secured to the surface by the anchoring function of the pores. An oil retaining sintered bearing is produced by subjecting such a sintered bearing to the impregnating step.

What is claimed is:

1. A production method for a sintered bearing, the method comprising:

compacting a metallic raw material powder into a bearing green compact;

sintering the green compact into a sintered compact;

forming a resin coating over the entire surface of the sintered compact;

removing the resin coating on a bearing surface of the sintered compact; and impregnating a lubricating fluid through the bearing surface from which the resin coating is removed.

2. The production method for a sintered bearing according to claim 1, wherein the resin coating is formed by electrodeposition.

3. The sintered bearing according to claim 2, wherein grooves for generating dynamic pressure are formed on the bearing surface.

4. The production method for a sintered bearing according to claim 1, wherein, grooves for generating dynamic pressure are formed on the bearing surface.

5. The production method for a sintered bearing according to claim 1, wherein pores exposed on the surface of the sintered bearing except for the bearing surface is filled with the resin.

* * * * *